(12) United States Patent
Kara

(10) Patent No.: US 12,229,112 B2
(45) Date of Patent: Feb. 18, 2025

(54) EFFICIENTLY MANAGING CHANGES TO MASTER DATA

(71) Applicant: SAP SE, Walldorf (DE)

(72) Inventor: Satish Kumar Kara, Bangalore (IN)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 17/732,168

(22) Filed: Apr. 28, 2022

(65) Prior Publication Data

US 2023/0350871 A1    Nov. 2, 2023

(51) Int. Cl.
*G06F 7/00* (2006.01)
*G06F 16/23* (2019.01)
*G06F 16/242* (2019.01)
*G06F 16/2453* (2019.01)
*G06F 17/00* (2019.01)

(52) U.S. Cl.
CPC ...... *G06F 16/2365* (2019.01); *G06F 16/2358* (2019.01); *G06F 16/2379* (2019.01); *G06F 16/242* (2019.01); *G06F 16/24532* (2019.01)

(58) Field of Classification Search
None
See application file for complete search history.

(56) References Cited

U.S. PATENT DOCUMENTS

| | | | |
|---|---|---|---|
| 2007/0294118 A1* | 12/2007 | Tait | G06Q 40/03 705/7.38 |
| 2008/0243885 A1* | 10/2008 | Harger | G06F 16/21 |
| 2009/0024589 A1* | 1/2009 | Sood | G06F 16/972 707/E17.135 |
| 2014/0244573 A1* | 8/2014 | Gonsalves | G06F 16/283 707/606 |
| 2015/0317371 A1* | 11/2015 | Ramamurthi | G06F 16/27 707/628 |
| 2017/0235737 A1* | 8/2017 | Livshits | H04W 4/60 707/723 |
| 2019/0197176 A1* | 6/2019 | Luo | G06F 16/9536 |

* cited by examiner

*Primary Examiner* — Tuan A Pham
(74) *Attorney, Agent, or Firm* — Fountainhead Law Group, PC

(57) ABSTRACT

Some embodiments provide a non-transitory machine-readable medium that stores a program executable by at least one processing unit of a device. The program receives a set of entities for updating a set of master data stored on a set of storages. The program further determines, for each entity in a subset of the set of entities, whether the entity exists in the set of master data stored on the set of storages. Based on the determinations, the program also updates the set of master data stored on the set of storages with the set of entities.

17 Claims, 10 Drawing Sheets

Receiving a set of entities for updating a set of master data stored on a set of storages — 710

Determining, for each entity in a subset of the set of entities, whether the entity exists in the set of master data stored on the set of storages — 720

Based on the determinations, updating the set of master data stored on the set of storages with the set of entities — 730

500

```
[
  {
    505  "Key 1": "K1", "Field 1": "F1", "Field 2": "F2",
         "Entity 2": [
      {
        510  "Key 1": "K1", "Key 2": "K3", "Field 1": "F5"
      },
      {
        515  "Key 1": "K1", "Key 2": "K5", "Field 1": "F18"
      },
      {
        520  "Key 1": "K1", "Key 2": "K7", "Field 1": "F19"
      },
      {
        525  "Key 1": "K1", "Key 2": "K8", "Field 1": "F20"
      }
    ]
  },
  {
    530  "Key 1": "K2", "Field 1": "F3", "Field 2": "F4",
         "Entity 2": [
      {
        535  "Key 1": "K2", "Key 2": "K6", "Field 1": "F8"
      }
    ]
  }
]
```

FIG. 5

EFFICIENTLY MANAGING CHANGES TO MASTER DATA

BACKGROUND

Many corporations use master data when conducting business electronically. In some instances, master data may represent data about business entities that provide context for business transactions. Common categories of master data include parties to transactions (e.g., individuals and organizations and well as their roles, such as customers, suppliers, employees, etc.), products, financial structures (e.g., ledgers, cost centers, etc.), locational concepts, etc. Since master data is used often in the day-to-day operations of corporations, updates to master data (e.g., a customer's shipping address changes, an employee changes departments, a supplier changes its name, etc.) need to be done in a timely manner Under one approach, updating an entity may involve deleting the entity and all child entities associated with the entity and then replacing the entity with a new entity and new child entities associated with the new entity.

SUMMARY

In some embodiments, a non-transitory machine-readable medium stores a program executable by at least one processing unit of a device. The program receives a set of entities for updating a set of master data stored on a set of storages. The program further determines, for each entity in a subset of the set of entities, whether the entity exists in the set of master data stored on the set of storages. Based on the determinations, the program also updates the set of master data stored on the set of storages with the set of entities.

In some embodiments, the program may further create a database transaction comprising updating the set of master data stored in the set of storages with the set of entities and commit the database transaction. Determining, for each entity in the subset of the set of entities, whether the entity exists in the set of master data stored on the set of storages may include generating a query for determining, for each entity in the subset of the set of entities, whether the entity exists in the set of master data stored on the set of storages; using the query to retrieve a result set of the query; and, based on the result set of the query, indicating, for each entity in the subset of the set of entities, whether to update the entity using an update operation or using an insert operation.

In some embodiments, updating the set of master data stored on the set of storages with the set of entities may include generating a first set of queries for inserting in the set of master data each entity in the subset of the set of entities determined to not exist in the set of master data; generating a second set of queries for updating each entity in the subset of the set of entities in the subset of the set of master data stored on the set of storages determined to exist in the set of master data; and executing the first and second sets of queries. The program may further determine, for each entity in the subset of the set of entities determined to not exist in the set of master data, a set of child entities in the set of entities associated with the entity based on a schema definition defining a plurality of entities and defining a set of relationships among the plurality of entities. The first set of queries comprises a set of insert queries for inserting in the set of master data the set of child entities associated with each entity in the subset of the set of entities determined to not exist in the set of master data. The program may further determine, for each entity in the subset of the set of entities determined to exist in the set of master data, a first set of child entities in the set of entities associated with the entity based on a schema definition defining a plurality of entities and defining a set of relationships among the plurality of entities; and determine, for each entity in the subset of the set of entities determined to exist in the set of master data, a second set of child entities stored in the set of master data and associated with the entity. The second set of queries may include a set of update queries for updating, for each entity in the subset of the set of entities determined to exist in the set of master data, the second set of child entities stored in the set of master data and associated with the entity with the first set of entities associated with the entity. The set of update queries may be performed in parallel.

In some embodiments, a method receives a set of entities for updating a set of master data stored on a set of storages. The method further determines, for each entity in a subset of the set of entities, whether the entity exists in the set of master data stored on the set of storages. Based on the determinations, the method also updates the set of master data stored on the set of storages with the set of entities.

In some embodiments, the method may further create a database transaction comprising updating the set of master data stored in the set of storages with the set of entities and commit the database transaction. Determining, for each entity in the subset of the set of entities, whether the entity exists in the set of master data stored on the set of storages may include generating a query for determining, for each entity in the subset of the set of entities, whether the entity exists in the set of master data stored on the set of storages; using the query to retrieve a result set of the query; and, based on the result set of the query, indicating, for each entity in the subset of the set of entities, whether to update the entity using an update operation or using an insert operation.

In some embodiments, updating the set of master data stored on the set of storages with the set of entities may include generating a first set of queries for inserting in the set of master data each entity in the subset of the set of entities determined to not exist in the set of master data; generating a second set of queries for updating each entity in the subset of the set of entities in the subset of the set of master data stored on the set of storages determined to exist in the set of master data; and executing the first and second sets of queries. The method may further determine, for each entity in the subset of the set of entities determined to not exist in the set of master data, a set of child entities in the set of entities associated with the entity based on a schema definition defining a plurality of entities and defining a set of relationships among the plurality of entities. The first set of queries comprises a set of insert queries for inserting in the set of master data the set of child entities associated with each entity in the subset of the set of entities determined to not exist in the set of master data. The method may further determine, for each entity in the subset of the set of entities determined to exist in the set of master data, a first set of child entities in the set of entities associated with the entity based on a schema definition defining a plurality of entities and defining a set of relationships among the plurality of entities; and determine, for each entity in the subset of the set of entities determined to exist in the set of master data, a second set of child entities stored in the set of master data and associated with the entity. The second set of queries may include a set of update queries for updating, for each entity in the subset of the set of entities determined to exist in the set of master data, the second set of child entities stored in the set of master data and associated with the entity with the first set of entities associated with the entity. The set of update queries may be performed in parallel.

In some embodiments, a system includes a set of processing units and a non-transitory machine-readable medium that stores instructions. The instructions cause at least one processing unit to receive a set of entities for updating a set of master data stored on a set of storages. The instructions further cause at least one processing unit to determine, for each entity in a subset of the set of entities, whether the entity exists in the set of master data stored on the set of storages. Based on the determinations, the instructions also cause at least one processing unit to update the set of master data stored on the set of storages with the set of entities.

In some embodiments, the instructions may further cause the at least one processing unit to create a database transaction comprising updating the set of master data stored in the set of storages with the set of entities and commit the database transaction. Determining, for each entity in the subset of the set of entities, whether the entity exists in the set of master data stored on the set of storages may include generating a query for determining, for each entity in the subset of the set of entities, whether the entity exists in the set of master data stored on the set of storages; using the query to retrieve a result set of the query; and, based on the result set of the query, indicating, for each entity in the subset of the set of entities, whether to update the entity using an update operation or using an insert operation.

In some embodiments, updating the set of master data stored on the set of storages with the set of entities may include generating a first set of queries for inserting in the set of master data each entity in the subset of the set of entities determined to not exist in the set of master data; generating a second set of queries for updating each entity in the subset of the set of entities in the subset of the set of master data stored on the set of storages determined to exist in the set of master data; and executing the first and second sets of queries. The instructions may further cause the at least one processing unit to determine, for each entity in the subset of the set of entities determined to not exist in the set of master data, a set of child entities in the set of entities associated with the entity based on a schema definition defining a plurality of entities and defining a set of relationships among the plurality of entities. The first set of queries comprises a set of insert queries for inserting in the set of master data the set of child entities associated with each entity in the subset of the set of entities determined to not exist in the set of master data. The instructions may further cause the at least one processing unit to determine, for each entity in the subset of the set of entities determined to exist in the set of master data, a first set of child entities in the set of entities associated with the entity based on a schema definition defining a plurality of entities and defining a set of relationships among the plurality of entities; and determine, for each entity in the subset of the set of entities determined to exist in the set of master data, a second set of child entities stored in the set of master data and associated with the entity. The second set of queries may include a set of update queries for updating, for each entity in the subset of the set of entities determined to exist in the set of master data, the second set of child entities stored in the set of master data and associated with the entity with the first set of entities associated with the entity. The set of update queries may be performed in parallel.

The following detailed description and accompanying drawings provide a better understanding of the nature and advantages of various embodiments of the present disclosure.

BRIEF DESCRIPTION OF THE DRAWINGS

FIG. 5 illustrates an example set of entities according to some embodiments according to some embodiments.

DETAILED DESCRIPTION

Figure 1:
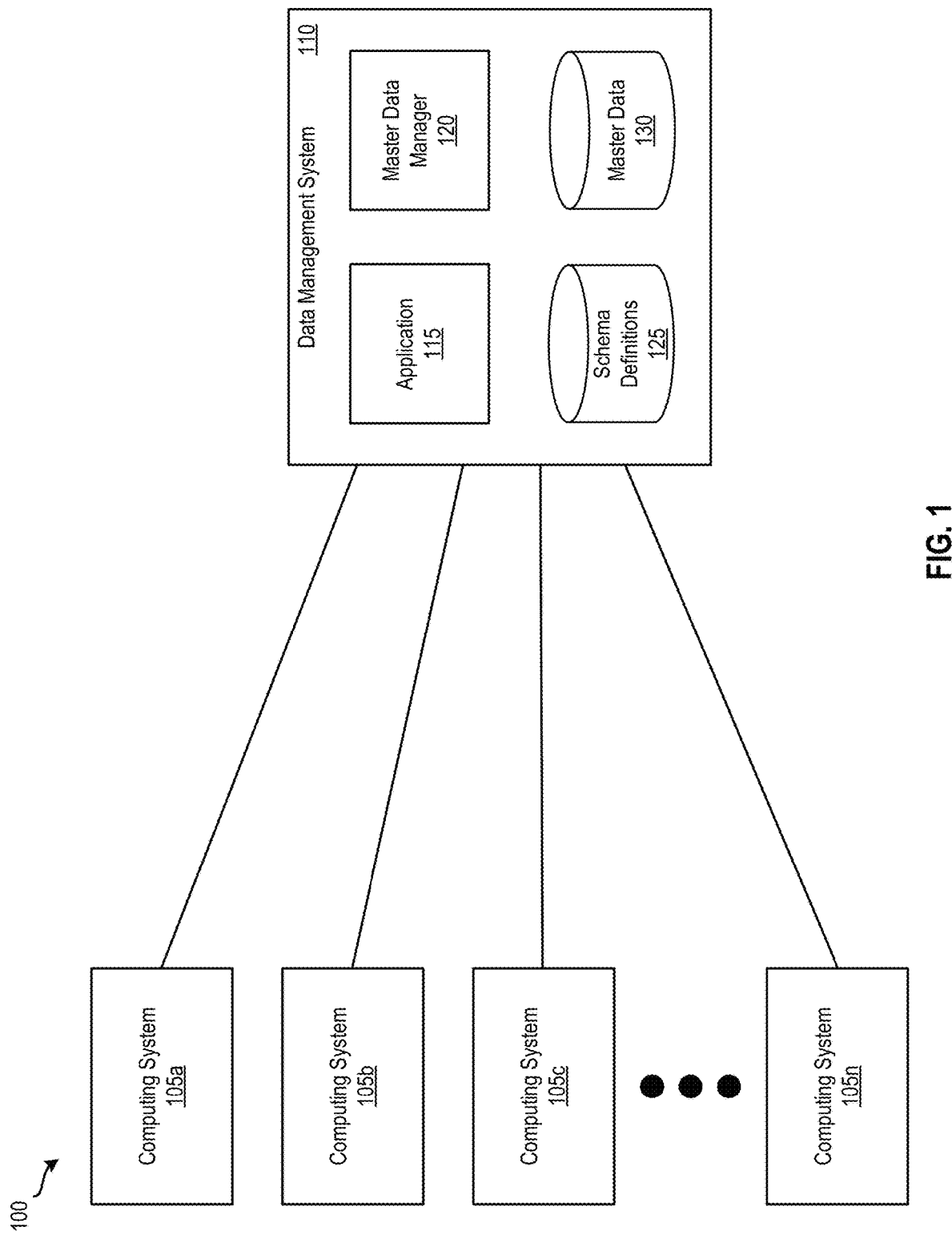
FIG. 1 illustrates a system for efficiently managing changes to master data according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for efficiently managing changes to master data. In some embodiments, a data management system is configured to manage master data. In addition, the data management system handles updates to master data that it manages. In some cases, the data management system can receive updates to master data from any number of different computing systems communicatively coupled to the data management system. In other cases, the data management system may receive updates to master data from an application operating on the data management system. Upon receiving an update to master data, the data management system determines parent entities in the update data. Then, the data management system generates a query for the parent entities and uses the query to retrieve the parent entities from the storage(s) storing the master data. Based on the result set of the query, the data management system determines whether each parent entity is associated with an update operation or an insert operation. For parent entities associated with an insert operation, the data management system generates insert queries for inserting the parent entities and any child entities associated with the parent entities in the storage(s) storing the master data. For parent entities associated with an update operation, the data management system generates update queries for updating the parent entities the update data with the parent entities stored in the master data storage(s) and updating any child entities associated with the parent entities in the update data with any child entities associated with the parent entities stored in the master data storage(s).

In some embodiments, master data is used to represent entities associated with the operation of a corporation. Examples of such entities may include buyer entities, supplier entities, customer entities, patient entities, product entities, asset entities, equipment entities, location entities (e.g., store entities, warehouse entities, factory entities, etc.), account entities, etc. In some embodiments, master data is non-transactional data that provides context for transactions.

The techniques described in the present application provide a number of benefits and advantages over conventional methods for managing queries. First, generating a single query for retrieving the parent entities reduces the amount of time it takes to retrieve the parent entities. Conventional methods may iteratively generate a query for a parent entity and use it to retrieve the parent entity. Second, updating only master data that are different in the update data and leaving master data that are the same as the update data reduces the amount of time to perform the update and reduces the input/output (I/O) operations. Conventional methods can delete all the relevant entities in the master data storage(s) and then replace it with the entities in the update data.

FIG. 1 illustrates a system 100 for efficiently managing changes to master data according to some embodiments. As shown, system 100 includes computing systems 105a-n and data management system 110. Each of the computing systems 105a-n is configured to interact and communicate with data management system 110. For example, each of the computing systems 105a-n may be configured to use master data stored in master data storage 130. In some such cases, a computing system 105 sends data management system 110 a request for a set of master data. In response to the request, the computing system 105 receives from data management system 110 the requested set of master data. As another example, each of the computing system 105a-n can send data management system 110 updates to master data. In some embodiments, a computing system 105 sends data management system 110 updates to master data in batches. For example, a computing system 105 may send at defined intervals (e.g., once a minute, once every five minutes, once an hour, etc.) updates to master data that the computing system 105 has accumulated since the last updates that computing system 105 sent to data management system 110. As another example, a computing system 105 can send a batch of master data updates once the computing system 105 has collected updates for a defined number of master data entities.

As illustrated, data management system 110 includes application 115, master data manager 120, schema definitions storage 125, and master data storage 130. In some embodiments, schema definitions storage 125 and master data storage 130 are implemented in a single physical storage while, in other embodiments, schema definitions storage 125 and master data storage 130 may be implemented across several physical storages. While FIG. 1 shows schema definitions storage 125 and master data storage 130 as part of data management system 110, one of ordinary skill in the art will appreciate that schema definitions storage 125 and/or master data storage 130 may be external to data management system 110 in some embodiments.

Figure 2:
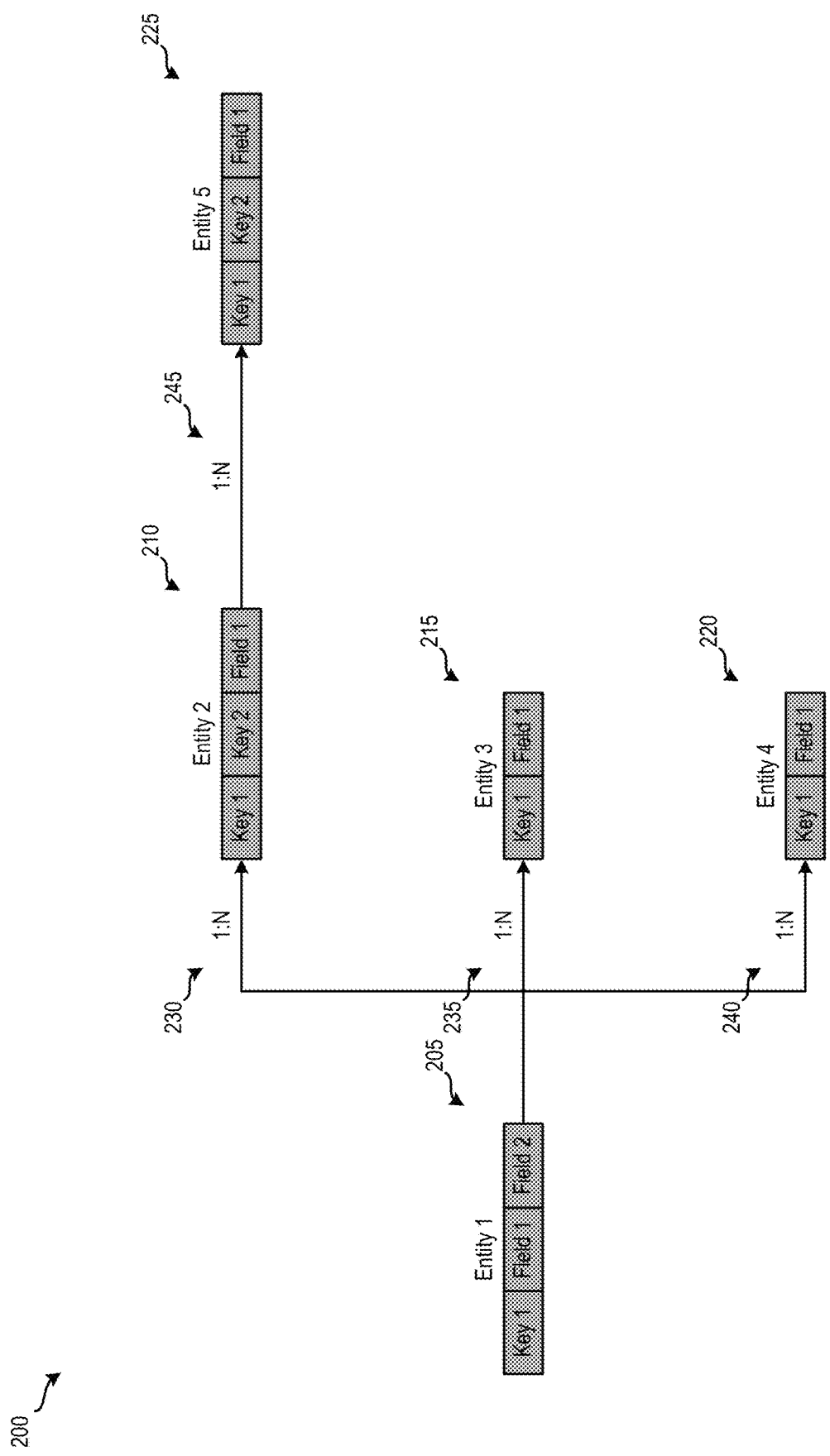
FIG. 2 illustrates an example schema definition according to some embodiments.

Schema definitions storage 125 stores schema definitions for master data. In some embodiments, a schema definition for master data specifies a set of entities and a set of relationships among the set of entities. Each entity in the set of entities can specify a unique identifier and a set of attributes. FIG. 2 illustrates an example schema definition 200 according to some embodiments. As shown, schema definition 200 includes entity definitions 205-225 and relationship definitions 230-245. Entity definition 205 defines a first entity ("Entity 1") that includes a unique identifier attribute ("Key 1") and two field attributes ("Field 1" and "Field 2"). Entity definition 210 defines a second entity ("Entity 2") that includes two unique identifier attributes ("Key 1" and "Key 2") and a field attribute ("Field 1"). Entity definition 215 defines a third entity ("Entity 3") that includes a unique identifier attribute ("Key 1") and a field attribute ("Field 1"). Entity definition 220 defines a fourth entity ("Entity 4") that includes a unique identifier attribute ("Key 1") and a field attribute ("Field 1"). Entity definition 225 defines a fifth entity ("Entity 5") that includes two unique identifier attributes ("Key 1" and "Key 2") and a field attribute ("Field 1"). Relationship definition 230 defines a one to N relationship between Entity 1 and Entity 2, relationship definition 235 defines a one to N relationship between Entity 1 and Entity 3, relationship definition 240 defines a one to N relationship between Entity 1 and Entity 4, and relationship definition 245 defines a one to N relationship between Entity 2 and Entity 5.

Figure 3:
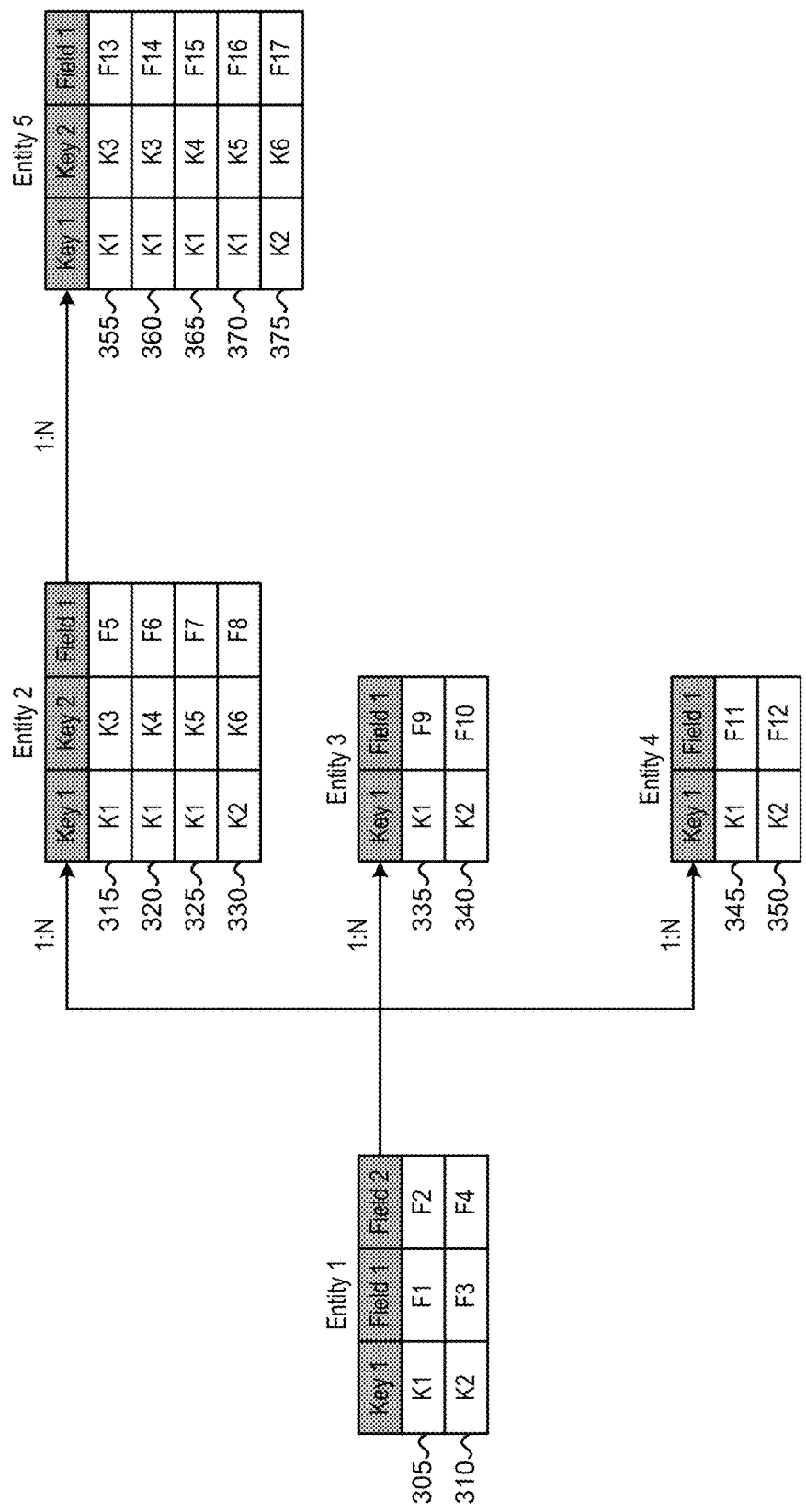
FIG. 3 illustrates example master data organized according to the schema definition illustrated in FIG. 2 according to some embodiments.

Returning to FIG. 1, master data storage 130 is configured to store master data (e.g., entities) organized according to schema definitions stored in schema definitions storage 125. FIG. 3 illustrates example master data 300 organized according to schema definition 200 according to some embodiments. As depicted in FIG. 3, master data 300 includes entities 305-375. Specifically, entities 305 and 310 are instances of entity definition 205. Entity 305 includes a value "K1" for attribute "Key 1," a value "F1" for attribute "Field 1," and a value "F2" for attribute "Field 2." Entity 310 includes a value "K2" for attribute "Key 1," a value "F3" for attribute "Field 1," and a value "F4" for attribute "Field 2." Entities 315-330 are instances of entity definition 210. Entities 305 and 315-325 are related since they have matching values for the "Key 1" attributes. Entities 310 and 330 are related as they have matching values for the "Key 1" attributes. Entity 315 includes a value "K1" for attribute "Key 1," a value "K3" for attribute "Key 2," and a value "F5" for attribute "Field 1." Entity 320 includes a value "K1" for attribute "Key 1," a value "K4" for attribute "Key 2," and a value "F6" for attribute "Field 1." Entity 325 includes a value "K1" for attribute "Key 1," a value "K5" for attribute "Key 2," and a value "F7" for attribute "Field 1." Entity 330 includes a value "K2" for attribute "Key 1," a value "K6" for attribute "Key 2," and a value "F8" for attribute "Field 1."

Entities 335 and 340 are instances of entity definition 215. Entities 305 and 335 are related because they have matching values for the "Key 1" attributes. Entities 310 and 340 are related since they have matching values for the "Key 1" attributes. Entity 335 includes a value "K1" for attribute "Key 1" and a value "F9" for attribute "Field 1." Entity 340 includes a value "K2" for attribute "Key 1" and a value "F10" for attribute "Field 1." Entities 345 and 350 are instances of entity definition 220. Entities 305 and 345 are related as they have matching values for the "Key 1" attributes. Entities 310 and 350 are related because they have matching values for the "Key 1" attributes. Entity 345 includes a value "K1" for attribute "Key 1" and a value "F11" for attribute "Field 1." Entity 350 includes a value "K2" for attribute "Key 1" and a value "F12" for attribute "Field 1."

Entities 355-375 are instances of entity definition 225. Entities 315, 355, and 370 are related since they have matching values for the "Key 1" and "Key 2" attributes. Similarly, entities 320 and 365 are related, entities 325 and 370 are related, and entities 330 and 375 are related. Entity 355 includes a value "K1" for attribute "Key 1," a value of "K3" for attribute "Key 2," and a value "F13" for attribute "Field 1." Entity 360 includes a value "K1" for attribute "Key 1," a value of "K3" for attribute "Key 2," and a value "F14" for attribute "Field 1." Entity 365 includes a value "K1" for attribute "Key 1," a value of "K4" for attribute "Key 2," and a value "F15" for attribute "Field 1." Entity 370 includes a value "K1" for attribute "Key 1," a value of "K5" for attribute "Key 2," and a value "F16" for attribute "Field 1." Entity 375 includes a value "K2" for attribute "Key 1," a value of "K6" for attribute "Key 2," and a value "F17" for attribute "Field 1."

Different embodiments can store entities 305-375 differently. For example, in some embodiments, instances of each entity definition may be stored in a separate table (e.g., entities 305 and 310 stored in a first table, entities 315-330 stored in a second table, entities 335 and 340 stored in a third table, entities 345 and 350 stored in a fourth table, and entities 355-375 stored in a fifth table). In other embodiments, entities 305-375 can be stored in a single table. One of ordinary skill in the art will understand that any number of different techniques may be used to store entities 305-375.

Returning to FIG. 1, application 115 is a software application operating on data management system 110 configured to use master data stored in master data storage 130. In some instances, application 140 may send master data manager 120 a request for a set of master data. In response to the request, application 115 can receive the requested set of master data from master data manager 120. In other cases, application 115 can provide updates to master data stored in master data storage 130.

Master data manager 120 is responsible for managing master data stored in master data storage 130. For example, master data manager 120 can receive requests for a set of master data from a requestor (e.g., a computing system 105, application 115, etc.). In response, master data manager 120 accesses master data storage 130 to retrieve the request set of master data and sends it to the requestor. As another example, master data manager 120 may receive updates to master data stored in master data storage 130. In response to receiving the updates, master data manager 120 determines a schema definition stored in schema definitions storage 125 associated with the master data updates. Then, master data manager 120 updates master data stored in master data storage 130 based on the schema definition. Details about how master data manager 120 handles updates to master data will be described below. In some embodiments, master data manager 120 can also provide a tool for creating schema definitions (e.g., schema definition 200) used to store master data. Upon receiving a schema definition (e.g., from a computing system 105, application 115, etc.), master data manager 120 stores the schema definition in schema definitions storage 125.

Figure 4:
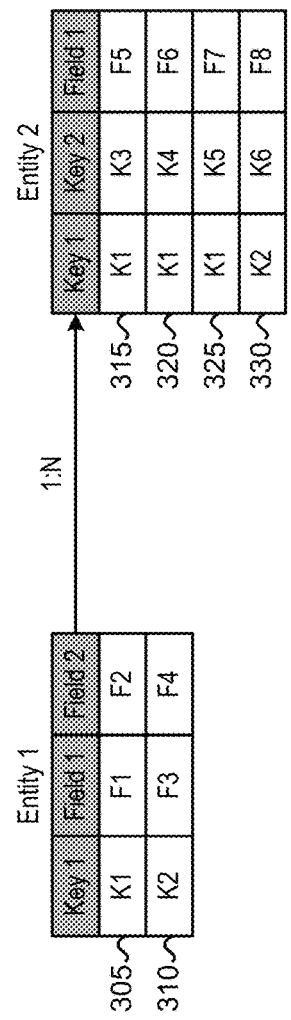
FIG. 4 illustrates the current state of example master data according to some embodiments.

An example operation will now be described by reference to FIGS. 4-6 according to some embodiments. In particular, this example operation shows how master data manager 120 handles changes to master data. FIG. 4 illustrates the current state of example master data 400 according to some embodiments. For this example, master data 400 is stored in master data storage 130 according to schema definition 200. As shown, master data 400 includes entities 305-330. The values of the attributes for each of the entities 305-330 are the same as those depicted in FIG. 3. The example operation begins by data management system 110 receiving (e.g., from a computing system 105, application 115, etc.) a set of entities along with a request to update master data stored in master data storage 130 with the set of entities according to schema definition 200.

FIG. 5 illustrates an example set of entities 500 according to some embodiments. In this example, set of entities 500 shows a portion of the set of entities used for updating master data stored in master data storage 130 according to schema definition 200. Specifically, set of entities 500 includes seven entities 505-535. Entities 510-525 are child entities of entity 505 and entity 535 is a child entity of entity 530. The child entities 510-525 and 535 are related to entities 505 and 530, respectively, according to relationship definition 230 specified in schema definition 200. Here, entities 505 and 530 are instances of entity definition 205. Entities 510-525 and 535 are instances of entity definition 210.

Returning to the example operation, once master data manager 120 receives the set of entities and the request, master data manager 120 determines whether the parent entities in set of entities 500 exist in master data storage 130. In some embodiments, master data manager 120 determines this by generating a single query for each of the parent entities 505 and 530. Then, master data manager 120 accesses master data storage 130 and uses the query to attempt to retrieve entities 505 and 530. The result set returned in response to the query indicates whether each of the entities 505 and 530 exist in master data storage 130. As depicted in FIGS. 4 and 5, entities 505 and 530 exist in the master data stored in master data storage 130 (i.e., the value of the "Key 1" field of each of the entities 305 and 310 matches the value of the "Key 1" field of each of the entities 505 and 530, respectively).

For each parent entity that does not exist in master data storage 130, master data manager 120 generates a set of insert queries for adding the parent entity and its associated descendant entities (e.g., child entities, grandchild entities, etc.) to master data storage 130. For instance, if entity 530 did not exist in master data storage 130, master data manager 120 would generate a set of insert queries for inserting entity 530 and its child entity 535 in master data storage 130. For each parent entity that does exist in master data storage 130, master data manager 120 updates the master data stored in master data storage 130 with the parent entity and its associated descendant entities. In some embodiments, master data manager 120 performs the update operation by merging each parent entity in the set of entities 500 and its associated descendant entities with the master data stored in master data storage 130. For example, in some such embodiments, master data manager 120 compares the value of the fields of each of the parent entity with the values of the corresponding entity retrieved from master data storage 130 via the single query described above. If the values are different, master data manager 130 generates an update query for updating the values of the corresponding entity in master data storage 130 with the values of the parent entity in the set of entities 500. In some instances, if the values are the same, master data manager 120 ignores the parent entity in the set of entities 500. In this example, master data manager 120 ignores the parent entities 505 and 530 as the values of the entities 505 and 530 match the values of the corresponding entities retrieved from master data storage 130. In other instances, even if the values are the same, master data manager 120 still generates a query for updating the values of the corresponding entity in master data storage 130 with the values of the parent entity in the set of entities 500.

To merge child entities in the set of entities 500 with the master data stored in master data storage 130, master data manager 120 generates a query for child entities of the corresponding parent entity in master data storage 130. In some embodiments, master data manager 120 generates a single query for retrieving child entities of each of the corresponding parent entities stored in master data storage 130. For example, to merge child entities of entity 305, master data manager 120 generates a query for instances of entities defined by entity definition 210 that have a value in the "Key 1" field that matches the value of the "Key 1" field of entity 505 ("K1" in this example). Master data manager 120 accesses master data storage 130 and uses the query to retrieve entities 315-325. Then, master data manager 120 checks whether any of the child entities retrieved from master data storage 130 do not exist in the child entities in the set of entities 500 and generates a delete query for each such child entities. For this example, master data manager 120 determines that entity 320 does not exist in the set of entities 500 because no child entity of entity 505 exists that has a value "K1" for the "Key 1" field and a value "K4" for the "Key 2" field. As such, master data manager 120 generates a delete query for deleting entity 320 from master data storage 130.

Next, master data manager 120 compares each of the remaining child entities retrieved from master data storage 130 with its corresponding entity in the set of entities 500. If the values of the fields of a particular corresponding entities do not match, master data manager 120 generates an update query for updating the values of the entity stored in master data storage 130 with the values of the corresponding entity in the set of entities 500. In this example, master data manager 120 determines that the values for entity 515 and the values for corresponding entity 325 do not match. Therefore, master data manager 120 generates an update query for updating the values of entity 325 with the values of entity 515. If the values of the fields of a particular corresponding entities match, master data manager 120 ignores the corresponding entity in the set of entities 500. Here, master data manager 120 determines that the values for entity 510 matches the values for the corresponding entity 315. Thus, master data manager 120 ignores entity 510.

Finally, master data manager 120 checks whether any child entities of the parent entity in the set of entities 500 do not exist in the child entities retrieved from master data storage 130 and generates an insert query for each such child entities. For this example, master data manager 120 determines that child entities 520 and 525 of entity 505 do not exist in the child entities retrieved from master data storage 130. Accordingly, master data manager 120 generate an insert query for inserting entity 520 as a child of entity 305 in master data storage 130. Similarly, master data manager 120 generates an insert query for inserting entity 525 as a child of entity 305 in master data storage 130. Master data manager 120 then executes all the insert, update, and/or delete queries generated for the update operation. In this example, those queries include the delete query for deleting entity 320 from master data storage 130, the update query for updating the values of entity 325 with the values of entity 515, the insert query for inserting entity 520 as a child of entity 305 in master data storage 130, and the insert query for inserting entity 525 as a child of entity 305 in master data storage 130. In some embodiments, master data manager 120 performs the different types of queries in parallel (e.g., insert queries, update queries, and/or delete queries performed in parallel). In some such embodiments, master data manager 120 generates a single query for each type of operation. For example, master data manager 120 can generate a single update query that performs each of the previously generated update queries, a single insert query that performs each of the previously generated insert queries, and a single delete query that performs each of the previously generated delete queries.

Figure 6:
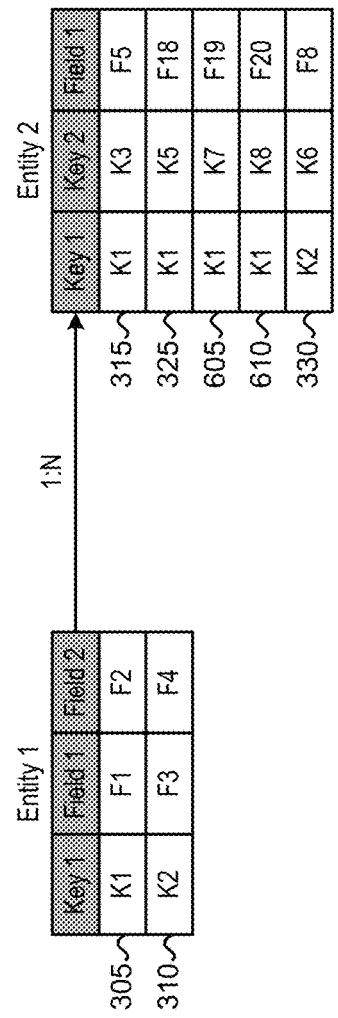
FIG. 6 illustrates the state of master data after the master data illustrated in FIG. 4 is updated with the example set of entities illustrated in FIG. 5 according to some embodiments.

FIG. 6 illustrates the state of master data 600 after master data 400 is updated with the set of entities 500 according to some embodiments. In this example, master data 600 is stored in master data storage 130 according to schema definition 200. As illustrated, master data 600 includes entities 305-315, 325, 330, 605, and 610. The values of the attributes for each of the entities 305-315 and 325 are the same as those depicted in FIG. 4 since the values did not change in the set of entities 500. Entity 325 has been updated with the values of corresponding entity 515. Lastly, entities 605 and 610 are entities 520 and 525 that have been added to master data storage 130.

In some embodiments, master data manager 120 can process the request to update master data stored in master data storage 130 via a single transaction (e.g., a single database transaction). In some such embodiments, master data manager 120 may create a transaction, perform all its processing (e.g., query for parent entities, update parent entities and associated child entities, generate queries for updating the master data, executing the queries, etc.), and then commit the transaction.

As mentioned above, set of entities 500 depicts a portion of the set of entities used for updating master data stored in master data storage 130 according to schema definition 200. Other entities related according to schema definition 200 are omitted for the purposes of simplicity and explanation. For example, the master data update data may include child entities related to entity 505 and/or 530 according to relationship definition 235, child entities related to entity 505 and/or 530 according to relationship definition 240, child entities related to entity 510, 515, 520, and/or 525 according to relationship definition 245, etc. One of ordinary skill in the art will appreciate that the same or similar techniques described herein can be employed to update master data stored in master data storage 130 with such other entities that are included in the master data update data.

Figure 7:
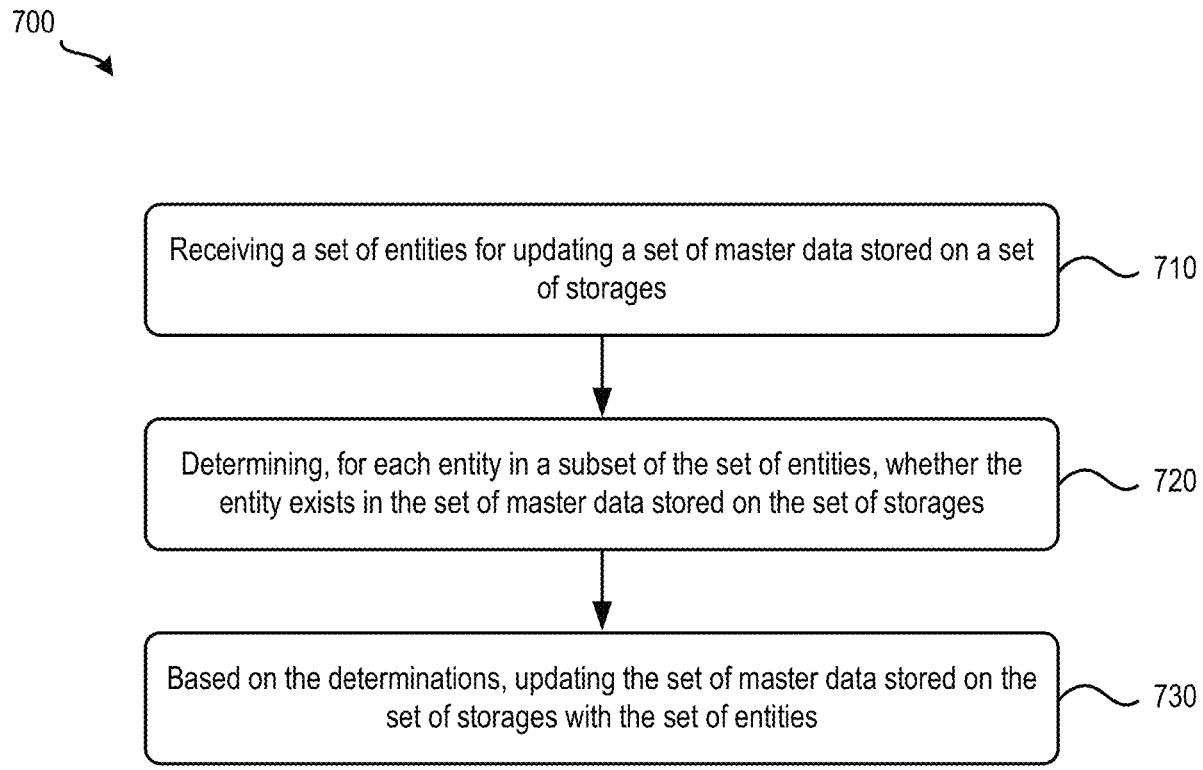
FIG. 7 illustrates a process for efficiently managing changes to master data according to some embodiments.

FIG. 7 illustrates a process 700 for efficiently managing changes to master data according to some embodiments. In some embodiments, master data manager 120 performs process 700. Process 700 begins by receiving, at 710, a set of entities for updating a set of master data stored on a set of storages. Referring to FIGS. 1 and 5 as an example, master data manager 120 can receive (e.g., from a computing system 105, from application 115, etc.) set of entities 500 for updating master data stored in master data storage 130 (e.g., master data 400).

Next, process 700 determines, at 720, for each entity in a subset of the set of entities, whether the entity exists in the set of master data stored on the set of storages. Referring to FIGS. 1, 4, and 5 as an example, master data manager 120 may determine whether each of the parent entities 505 and 530 in the set of entities 500 exist in master data 400.

Finally, based on the determinations, process 700 updates the set of master data stored on the set of storages with the set of entities. Referring to FIGS. 1, 4, and 5, master data manager 120 can update master data 400 with the set of entities 500, as described in the example operation above.

Figure 8:
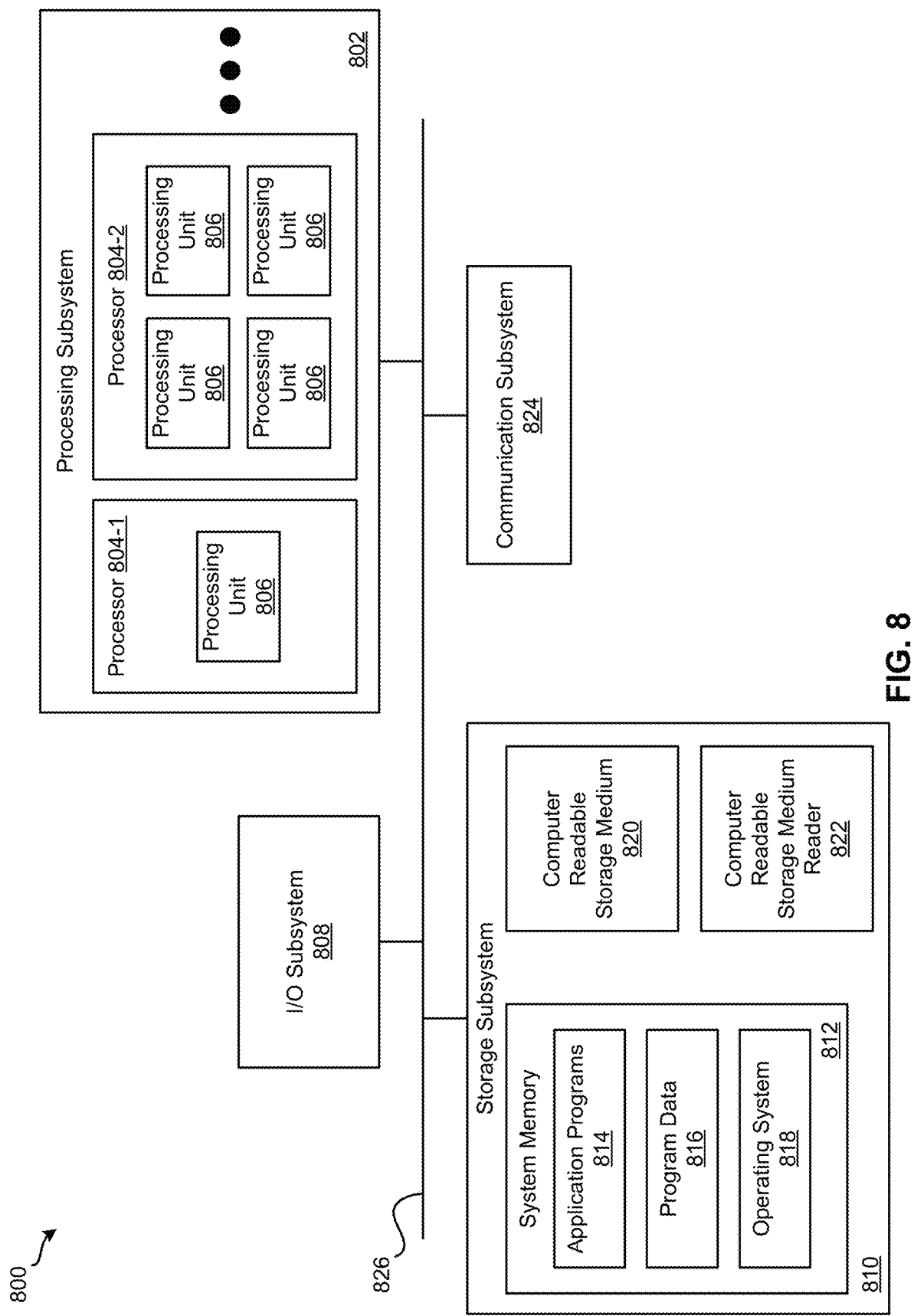
FIG. 8 illustrates an exemplary computer system, in which various embodiments may be implemented.

FIG. 8 illustrates an exemplary computer system 800 for implementing various embodiments described above. For example, computer system 800 may be used to implement computing systems 105a-n and data management system 110. Computer system 800 may be a desktop computer, a laptop, a server computer, or any other type of computer system or combination thereof. Some or all elements of application 115, master data manager 120, or combinations thereof can be included or implemented in computer system 800. In addition, computer system 800 can implement many of the operations, methods, and/or processes described above (e.g., process 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to process 700.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM). System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814 (e.g., application 115), program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., application 115 and master data manager 120) and/or processes (e.g., process 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
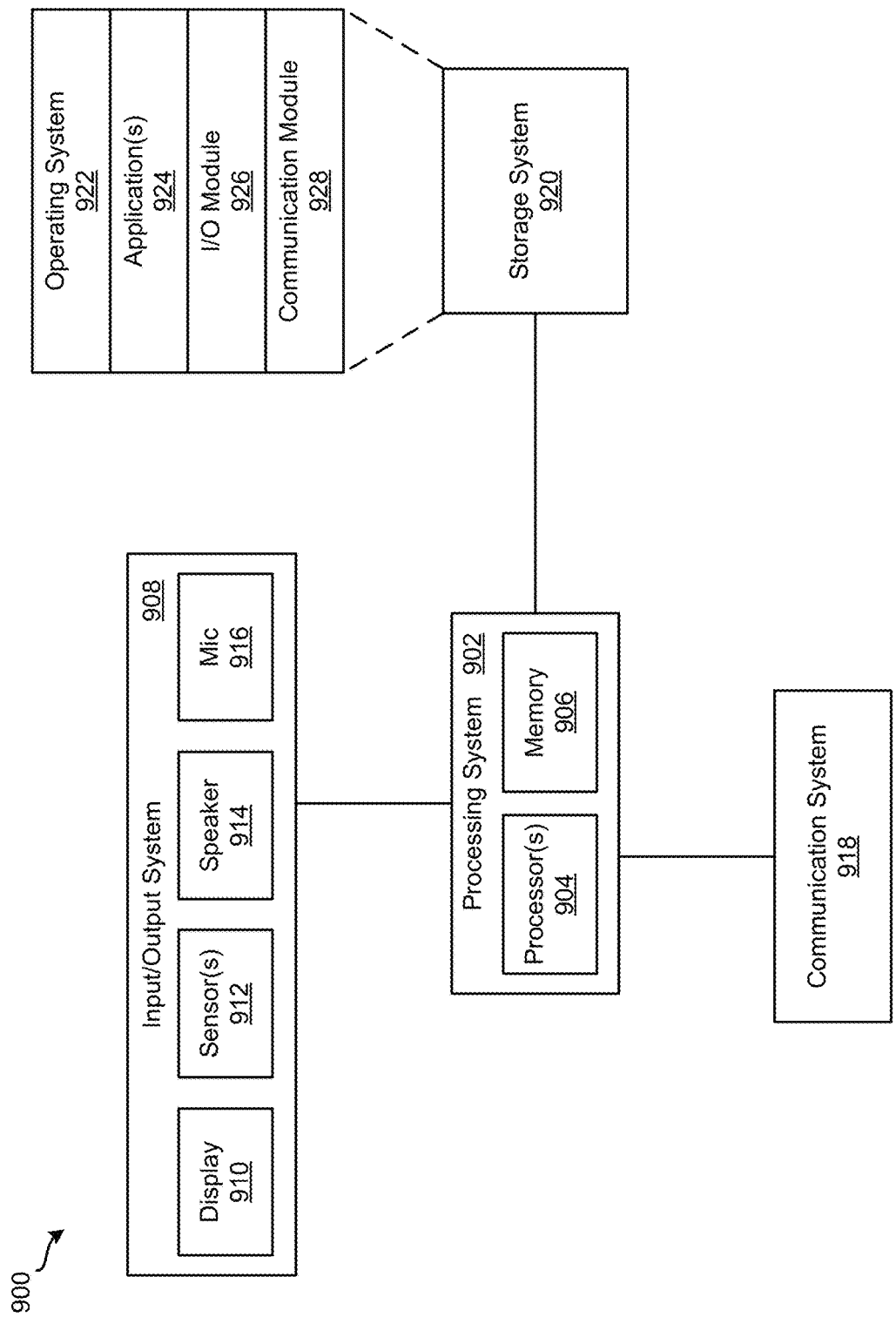
FIG. 9 illustrates an exemplary computing device, in which various embodiments may be implemented.

FIG. 9 illustrates an exemplary computing device 900 for implementing various embodiments described above. For example, computing device 900 may be used to implement computing systems 105*a-n*. Computing device 900 may be a cellphone, a smartphone, a wearable device, an activity tracker or manager, a tablet, a personal digital assistant (PDA), a media player, or any other type of mobile computing device or combination thereof. As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
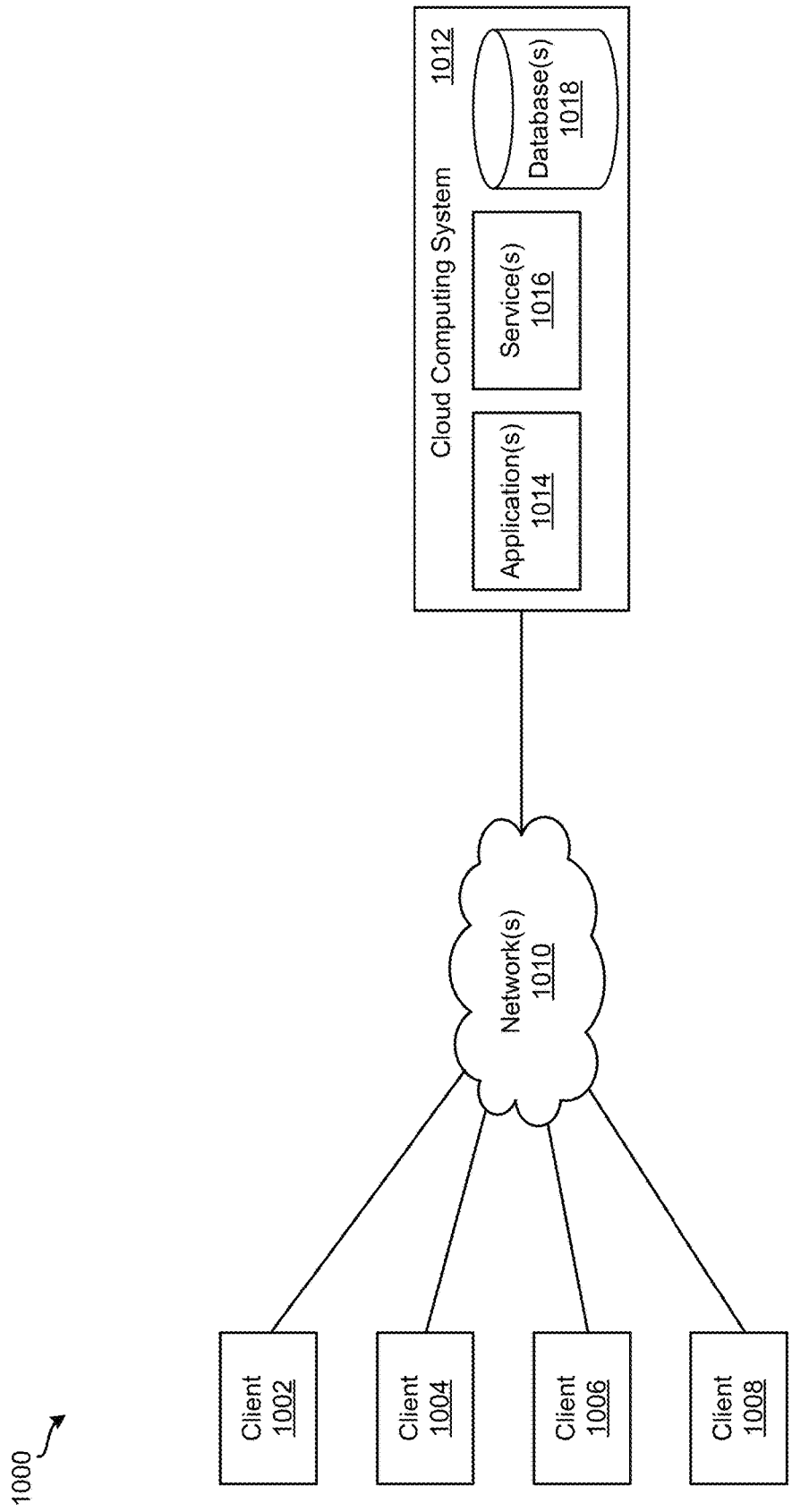
FIG. 10 illustrates an exemplary system, in which various embodiments may be implemented.

FIG. 10 illustrates an exemplary system 1000 for implementing various embodiments described above. For example, client devices 1002-1008 may be used to implement computing systems 105*a-n* and cloud computing system may be used to implement data management system 110. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1012 is referred to as a "cloud service." Typically, servers and systems that make up cloud computing system 1012 are different from the on-premises servers and systems of a customer. For example, cloud computing system 1012 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, schema definitions storage 125 and master data storage 130 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
receiving an update comprising a set of entities for updating a set of master data stored on a set of storages, wherein the set of master data comprises data corresponding to one or more business entities shared across a plurality of applications, the set of storages not storing transactional application data for the plurality of applications, the update comprising one or more parent entities associated with one or more child entities, wherein child entities are stored in separate tables than the parent entities, and wherein each child entity has only one parent entity;
determining, for each parent entity in the set of entities in the update, whether the parent entity and one or more child entities of each parent entity in the update exists in the set of master data stored on the set of storages by:
generating a single query for determining, for each parent entity in the set of entities in the update, whether the parent entity exists in the set of master data stored on the set of storages,
executing the single query to retrieve a result set for the single query from the set of storages, and
based on the result set for the single query, indicating, for each parent entity in the set of entities in the update, whether to update the parent entity using an update operation or using an insert operation,
based on the determinations, modifying the set of master data stored on the set of storages with the set of entities, the modifying comprising
wherein when a particular parent entity in the update does not exist in the set of data stores, generating and executing a first set of queries to insert the particular parent entity and one or more particular child entities of the particular parent entity to the set of storages, and
wherein when a particular parent entity in the update does exist, the single query compares a first value associated with the particular parent entity in the update with a second value associated with the particular parent entity in the set of storages,
wherein when the first and second values differ, generating and executing a second set of queries for updating each parent entity in the set of entities in the set of master data stored on the set of storages, and when the first value is a same value as the second value, the first value is ignored and no update is performed.

2. The non-transitory machine-readable medium of claim 1, wherein the program further comprises a set of instructions for:
creating a database transaction comprising updating the set of master data stored in the set of storages with the set of entities; and
committing the database transaction.

3. The non-transitory machine-readable medium of claim 1, wherein the set of master data stored on the set of storages is non-transactional data that provides context for transactions.

4. The non-transitory machine-readable medium of claim 1, wherein the program further comprises a set of instructions for determining, for each parent entity in the set of entities determined to not exist in the set of master data, a set of child entities in the set of entities associated with the parent entity based on a schema definition defining a plurality of entities and defining a set of relationships among the plurality of entities, wherein the first set of queries comprises a set of insert queries for inserting in the set of master data the set of child entities associated with each parent entity in the set of entities determined to not exist in the set of master data.

5. The non-transitory machine-readable medium of claim 1, wherein the program further comprises a set of instructions for:
determining, for each parent entity in the set of entities determined to exist in the set of master data, a first set of child entities in the set of entities associated with the parent entity based on a schema definition defining a plurality of entities and defining a set of relationships among the plurality of entities; and
determining, for each parent entity in the set of entities determined to exist in the set of master data, a second set of child entities stored in the set of master data and associated with the parent entity,
wherein the second set of queries comprises a set of update queries for updating, for each parent entity in the set of entities determined to exist in the set of master data, the second set of child entities stored in the set of master data and associated with the parent entity with the first set of entities associated with the parent entity.

6. The non-transitory machine-readable medium of claim 5, wherein the set of update queries are performed in parallel.

7. A method comprising:
receiving an update comprising a set of entities for updating a set of master data stored on a set of storages, wherein the set of master data comprises data corresponding to one or more business entities shared across a plurality of applications, the set of storages not storing transactional application data for the plurality of applications, the update comprising one or more parent entities associated with one or more child entities, wherein child entities are stored in separate tables than the parent entities, and wherein each child entity has only one parent entity;
determining, for each parent entity in the set of entities in the update, whether the parent entity and one or more child entities of each parent entity in the update exists in the set of master data stored on the set of storages by:
generating a single query for determining, for each parent entity in the set of entities in the update, whether the parent entity exists in the set of master data stored on the set of storages,
executing the single query to retrieve a result set for the single query from the set of storages, and
based on the result set for the single query, indicating, for each parent entity in the set of entities in the update, whether to update the parent entity using an update operation or using an insert operation,
based on the determinations, modifying the set of master data stored on the set of storages with the set of entities, the modifying comprising
wherein when a particular parent entity in the update does not exist in the set of data stores, generating and executing a first set of queries to insert the particular parent entity and one or more particular child entities of the particular parent entity to the set of storages, and
wherein when a particular parent entity in the update does exist, the single query compares a first value associated with the particular parent entity in the update with a second value associated with the particular parent entity in the set of storages,
wherein when the first and second values differ, generating and executing a second set of queries for updating each parent entity in the set of entities in the set of master data stored on the set of storages, and when the first value is a same value as the second value, the first value is ignored and no update is performed.

8. The method of claim 7 further comprising:
creating a database transaction comprising updating the set of master data stored in the set of storages with the set of entities; and
committing the database transaction.

9. The method of claim 7, wherein the set of master data stored on the set of storages is used to represent entities associated with the operation of a corporation.

10. The method of claim 7 further comprising determining, for each parent entity in the set of entities determined to not exist in the set of master data, a set of child entities in the set of entities associated with the parent entity based on a schema definition defining a plurality of entities and defining a set of relationships among the plurality of entities, wherein the first set of queries comprises a set of insert queries for inserting in the set of master data the set of child entities associated with each parent entity in the set of entities determined to not exist in the set of master data.

11. The method of claim 7 further comprising:
determining, for each parent entity in the set of entities determined to exist in the set of master data, a first set of child entities in the set of entities associated with the parent entity based on a schema definition defining a plurality of entities and defining a set of relationships among the plurality of entities; and
determining, for each parent entity in the set of entities determined to exist in the set of master data, a second set of child entities stored in the set of master data and associated with the parent entity,
wherein the second set of queries comprises a set of update queries for updating, for each parent entity in the set of entities determined to exist in the set of master data, the second set of child entities stored in the set of master data and associated with the parent entity with the first set of entities associated with the parent entity.

12. The method of claim 11, wherein the set of update queries are performed in parallel.

13. A system comprising:
a set of processing units; and
a non-transitory machine-readable medium storing instructions that when executed by at least one processing unit in the set of processing units cause the at least one processing unit to:
receive an update comprising a set of entities for updating a set of master data stored on a set of storages, wherein the set of master data comprises data corresponding to one or more business entities shared across a plurality of applications, the set of storages not storing transactional application data for the plurality of applications, the update comprising one or more parent entities associated with one or more child entities, wherein child entities are stored in separate tables than the parent entities, and wherein each child entity has only one parent entity;
determine, for each parent entity in the set of entities in the update, whether the parent entity and one or more child entities of each parent entity in the update exists in the set of master data stored on the set of storages by:
generate a single query for determining, for each parent entity in the set of entities in the update, whether the parent entity exists in the set of master data stored on the set of storages,
execute the single query to retrieve a result set for the single query from the set of storages, and
based on the result set for the single query, indicating, for each parent entity in the set of entities in the update, whether to update the parent entity using an update operation or using an insert operation,
based on the determinations, modifying the set of master data stored on the set of storages with the set of entities, the modifying comprising
wherein when a particular parent entity in the update does not exist in the set of data stores, generating and executing a first set of queries to insert the particular parent entity and one or more particular child entities of the particular parent entity to the set of storages, and
wherein when a particular parent entity in the update does exist, the single query compares a first value associated with the particular parent entity in the update with a second value associated with the particular parent entity in the set of storages, wherein when the first and second values differ, generating and executing a second set of queries for updating each parent entity in the set of entities in the set of master data stored on the set of storages, and when the first value is a same value as the second value, the first value is ignored and no update is performed.

14. The system of claim 13, wherein the instructions further cause the at least one processing unit to:
create a database transaction comprising updating the set of master data stored in the set of storages with the set of entities; and
commit the database transaction.

15. The system of claim 13, wherein the set of master data stored on the set of storages is non-transactional data that provides context for transactions.

16. The system of claim 13, wherein the instructions further cause the at least one processing unit to determine, for each parent entity in the set of entities determined to not exist in the set of master data, a set of child entities in the set of entities associated with the parent entity based on a schema definition defining a plurality of entities and defining a set of relationships among the plurality of entities, wherein the first set of queries comprises a set of insert queries for inserting in the set of master data the set of child entities associated with each parent entity in the set of entities determined to not exist in the set of master data.

17. The system of claim 13, wherein the instructions further cause the at least one processing unit to:
determine, for each parent entity in the set of entities determined to exist in the set of master data, a first set of child entities in the set of entities associated with the parent entity based on a schema definition defining a plurality of entities and defining a set of relationships among the plurality of entities; and
determine, for each parent entity in the set of entities determined to exist in the set of master data, a second set of child entities stored in the set of master data and associated with the parent entity,
wherein the second set of queries comprises a set of update queries for updating, for each parent entity in the set of entities determined to exist in the set of master data, the second set of child entities stored in the set of master data and associated with the parent entity with the first set of entities associated with the parent entity.

* * * * *